July 15, 1958 J. R. HOLLINS 2,843,835
SIGNAL LAMP SWITCH
Filed Oct. 12, 1953 2 Sheets-Sheet 2

INVENTOR
Jesse R Hollins
BY
ATTORNEY

United States Patent Office 2,843,835
Patented July 15, 1958

2,843,835

SIGNAL LAMP SWITCH

Jesse R. Hollins, Brooklyn, N. Y., assignor, by mesne assignments, to Abraham Hollins and Jesse R. Hollins, Brooklyn, and Lewis S. Hollins, Great Neck, and Theodore D. Davidson, New York, N. Y.

Application October 12, 1953, Serial No. 385,433

7 Claims. (Cl. 340—81)

This invention relates to lighting and signalling system for automotive vehicles and, more particularly, to a novel combined headlamp and emergency signal control switch.

Modern automotive vehicles are equipped with a two-position headlamp control switch, for controlling the usual front and rear mounted driving lamps, and usually with separate directional switch means for controlling twin direction signalling lamps. In one "on" position of the headlamp control switch, the tail lamps, license plate lamp or lamps, and the front mounted parking lamps are illuminated. In the other "on" position, the parking lamps are extinguished and the headlamps are illuminated.

In prior applications and patents, I have disclosed novel "flare" switch arrangements whereby signal lamps on a vehicle may be simultaneously flashed, in synchronism or in alternation, to give warning of an emergency stopping or parking of the vehicle; and in my aforesaid prior applications and patents such arrangements have usually been incorporated in, or wired in combination with, the directional signalling switch.

In my copending application Serial No. 381,163, filed September 21, 1953, for "Signal Lamp Switch," issued as Patent No. 2,787,779 on April 2, 1957. I have shown and described a novel emergency signalling arrangement wherein the "flare switch" is incorporated with the headlamp control switch in a single unit arrangement. The usual two "on" position headlamp control switch is replaced by a control switch having a "neutral" or "off" position and four "on" positions. Two "on" positions are provided on either side of the neutral position.

The two positions to one side of "neutral" or "off," provide the usual headlamp circuit connections, one being the "parking lamp" position and the other the "headlamp" position. In the first position to the other side of "neutral," all the signal lamps are flashed and the license plate lamp means is steadily illuminated. In the second "flare" position, the same occurs but the headlamps are also illuminated to provide light for tire changing, emergency repairs, etc. The flasher for the "flare" position is connected to the "live" contact of the ignition switch, or the ammeter, so that the "flare" signals are operative even if the ignition switch is open. Also, a separate connection is made to the "live" contact of the ignition switch for steadily illuminating the license plate lamp in both "flare" positions and the headlamps in one "flare" position.

However, many passenger vehicles are not equipped with turn directional signalling arrangements, having only the usual lamp components such as parking, tail, head, license plate, and "stop" lamps. The present invention is accordingly directed to a novel combined headlamp control and "flare" switch having two "flare" positions in which the parking lamps and tail lamps are flashed as emergency warning lamps. In both "flare" positions, the license plate lamp means is steadily illuminated and, in one "flare" position, the headlamps are steadily illuminated to provide light for repairs and the like.

A feature of the invention switch is the provision for "cutting out" the brake-pedal operated stop lamps in both "flare" positions of the headlamp-flare control switch. These stop lamps are usually much higher in candle-power, and consequently in current drain, than the parking and tail lamps. In the flare positions, the current drain of the flasher, plus that of the parking lamps, tail lamps, license plate lamp means, and, in one flare position, of the headlamps, is substantial, thereby placing a heavy load on the battery or generator. If the stop lamps were operated in either flare position, the current drain would be further and substantially increased, thus draining the battery at a dangerously high rate; and their illumination would be of such intensity as to diminish the illumination value in the signalling effect of the flashing tail lights.

To avoid this, in the invention arrangement the energizing circuit for the stop lamps is carried through the invention switch, contrary to the usual arrangement where the stop lamp circuit is independent of the headlamp control switch. The contact arrangement of the control switch is so arranged that the stop lamps can be operated only in the "off" (neutral), parking lamps "on," and headlamps "on" positions of the switch, and the stop lamp energizing circuit is open in the two flare positions of the switch.

For an understanding of the invention arrangement, reference is made to the following description of a typical embodiment thereof as illustrated in the accompanying drawings. In the drawings.

Figure 1:
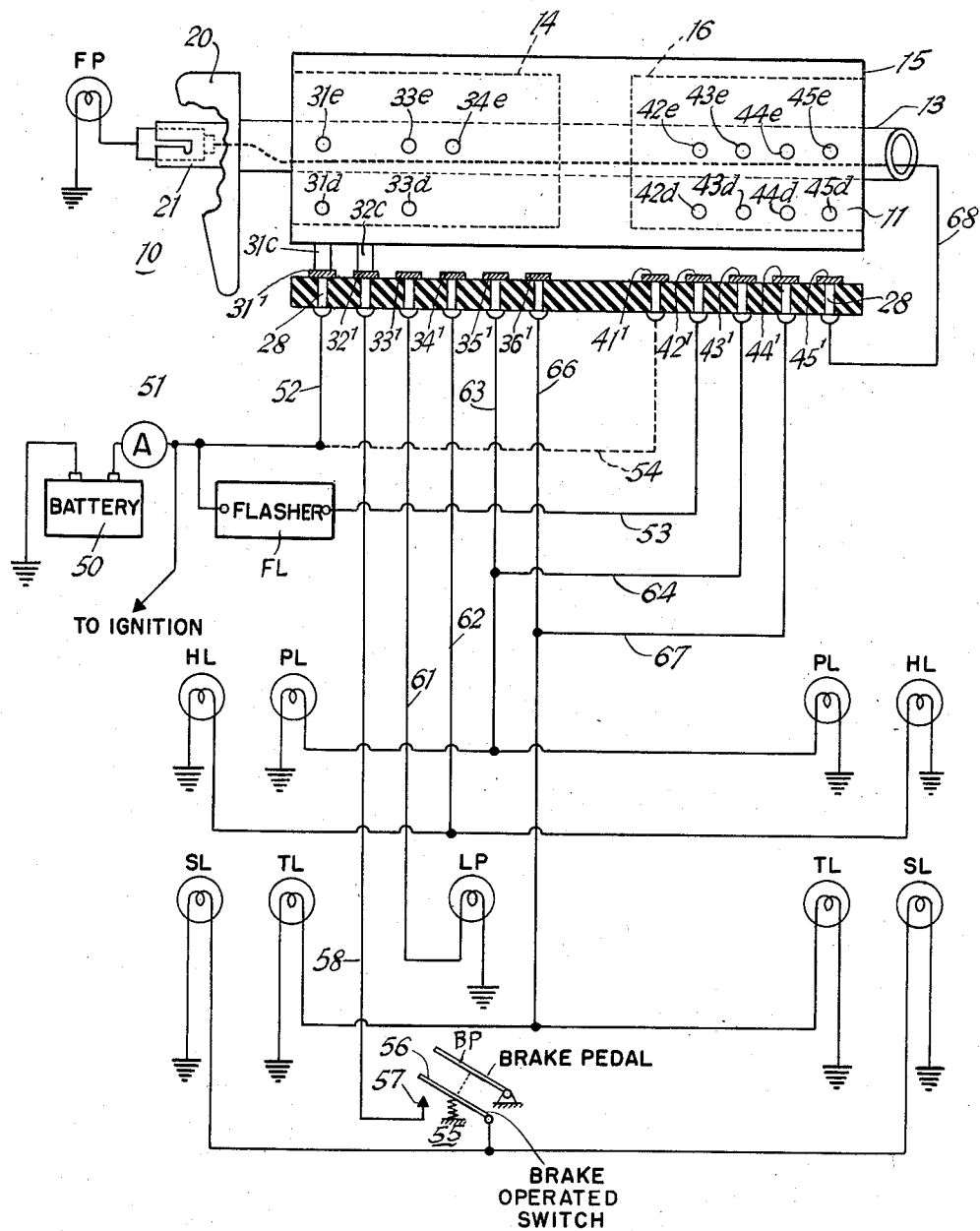
Fig. 1 is a combined schematic wiring diagram of the invention signalling arrangement, and partially schematic elevation view of the flare side of the invention switch, showing the latter in the "off" position.
Figure 2:
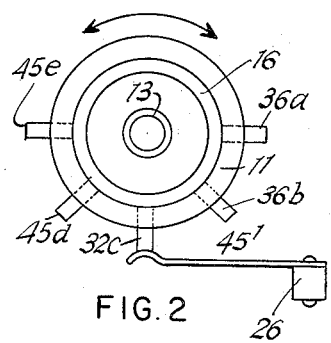
Fig. 2 is a rear end elevational view of the switch.

Referring to Figs. 1 through 5, a drum switch 10 embodying the invention, and which may be substituted for the usual headlamp control switch is illustrated as incorporating a drum 15 and a contact finger arrangement 25 cooperable with drum 15. Drum 15 includes a cylinder 11 of dielectric material formed with reduced ends 12, 12 forming bearings or mountings. A tube 13 extends in fixed coaxial relation through cylinder 11 to form a conduit or conductor. Set into each end of cylinder 11 are sleeves 14, 16 of conductive material, the inner ends of the sleeves being spaced and sleeve 14 being somewhat longer than sleeve 16. The ends of sleeves 14 and 16 are substantially flush with the ends of dielectric cylinder 11.

The outer end of central tube 13 serves to mount the control knob 20 for switch 10. This control knob is recessed to receive a bayonet type lamp socket 21, which may be mounted on tube 13 and receives a "flare" pilot lamp FP. A suitable lens 22 may close the outer end of the lamp recess in knob 20.

Figure 3:
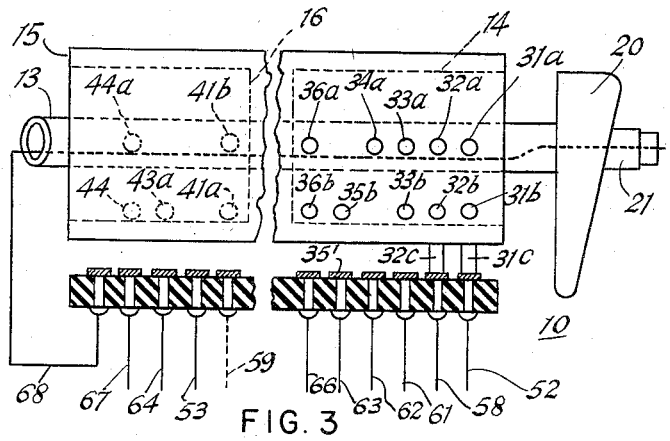
Fig. 3 is a partially schematic elevation view of the "parking lamp-headlamp" side of the switch, also showing the latter in the "off" position, and further illustrating a modified contact arrangement.
Figure 4:
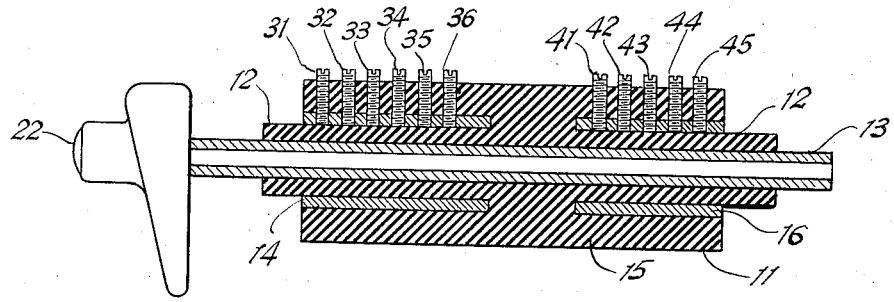
Fig. 4 is an axial sectional view through a drum of one form of switch embodying the invention.
Figure 5:
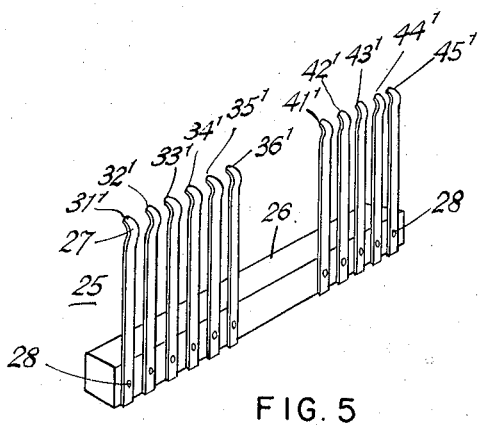
Fig. 5 is a perspective view of a contact finger arrangement utilized with the drum of Fig. 1.

Drum 15 carries two sets of contacts, 31—36 and 41—45, cooperable with contact finger arrangement 25. These contacts may be threaded radially through cylinder 11 into engagement with sleeves 14 and 16, respectively. The contacts project equal distances radially from sleeve 11. Contact group 31—36, which may be termed the "headlamp control" group, includes six contacts, and the "flare" contact group 41—45 includes five contacts. As will be described more fully hereinafter, the contact positions of each group are uniformly spaced axially of cylinder 11 and, at each axial position, there are five contact locations in the same diametric plane spaced uniformly over 180° of the arcuate surface of sleeve 11, the locations being at 45° intervals. All of the contact locations are not occupied, the contacts being arranged in a pre-set pattern as indicated in Figs. 1 and 3.

The contact finger arrangement 25 (Fig. 5) includes two sets of spring metal fingers 31'—36" and 41'—45' mounted on a dielectric block 26. The fingers are spaced longitudinally of block 26 to conform to the axial spacing of the contact positions on drum 15. Each figure has a curved free end 27 and is secured to block 26 by a rivet 28 acting as a terminal for circuit connections.

Fig. 1 illustrates the circuit connections to the lamps and the development of drum 15. In Figs. 1 and 3 the contacts in the "headlamp" position are labelled "a," those in the "parking lamp" position "b," those in the "off" or "neutral" position "c," those in the first "flare" position "d" and those in the second "flare" position "e."

Referring to Fig. 1, the usual grounded vehicle battery 50 is connected to ammeter 51. In the usual manner, the vehicle has a pair of front-mounted headlamps HL and front-mounted parking lamps PL. Also, the lamp arrangement includes the usual tail lamps TL, license plate illuminating lamp or lamps LP, and stop lamps SL controlled by brake pedal operated switch BS.

In accordance with the invention, ammeter 51 is connected by conductor 52 to contact finger 31' which engages contacts 31a through 31e. Thus, sleeve 15 is connected to battery 50 in all five positions of switch 10. Ammeter 51 is also connected to a flasher FL connected by a conductor 53 to contact fingers 42' which engages contacts 42d and 42e in the two flare positions of switch 10. Thus, sleeve 16 is connected to ammeter 51 through flasher FL in the two flare positions.

Contact finger 41' is indicated as connected to ammeter 51 by a conductor 54, shown in broken lines. This contact finger, and its associated contacts 41, are provided for an alternative circuit connection of switch 10 described more fully hereinafter.

The stop lamps SL are connected to the movable arm 56 of a switch 55 operated by break pedal BF. Normally open contact 57 of switch 55 is connected by conductor 58 to contact finger 32' which engages contacts 32a, 32b, and 32c, respectively, in the "headlamps on," "parking lamps on," and "off" positions of switch 10. Thus, the stop lamps can be energized, responsive to operation of the brake pedal, in any one of these three positions of switch 10. However, there are no contacts 32 in the "d" or "e" positions of switch 10. Consequently, switch 55 is ineffective to energize stop lamps SL in either flare position of switch 10. Thereby, the stop lamps cannot impose any additional current drain on battery 50 or detract from the illumination value in the signalling effect of the flashing tail lights in either of the flare positions of switch 10.

License plate lamp means LP, which may be one or more lamps, is connected by a conductor 61 to contact finger 33' engageable with contacts 33a, 33b, 33d, and 33e. Thus, lamp means LP is energized in any of the four "on" positions of switch 10.

Headlamps HL are connected by a conductor 62 to contact finger 34' engageable with contacts 34a and 34e only. Thus, lamps HL are energized only in the "headlamps on" and second "flare" positions of switch 10, being steadily illuminated in either of these two positions.

Parking lamps PL are connected, by conductor 63, to contact finger 35' and, by conductor 64, to contact finger 43'. Finger 35' engages only contact 35b, so that lamps PL are steadily illuminated only in the "parking lamps on" position of switch 10. Contact finger 43' engages contacts 43d and 43e, so that lamps PL are flashed in either flare position of switch 10.

Tail lamps TL are connected by conductor 66, to finger 36' and, by conductor 67, to finger 44'. Finger 36' engages contacts 36a and 36b, so that lamps TL are steadily illuminated in either the "parking lamps on" or "headlamps on" position of switch 10. Finger 44' engages contacts 44d and 44e, so that the tail lamps are flashed in both flare positions of switch 10.

Flare pilot lamp FP is connected, by conductor 68 extending through, or alternatively connected to, tube 13, to finger 45' which engages contacts 45d and 45e. Lamp FP is thus flashed in either flare position of switch 10.

With the described arrangement, switch 10 operates in the following manner. In the illustrated off position, switch 55 is connected to ammeter 51, so that operation of brake pedal BP lights stop lamps SL. If knob 20 is turned 45° clockwise, stop lamps SL are lit by operation of brake pedal BP. In this "parking lamps on" position, license plate lamp means LP, parking lamps PL, and tail lamps TL are steadily illuminated by virtue of cylinder 14 being connected to battery 50 by finger 31'.

If knob 20 is turned 90° clockwise to the "headlamps on" position, stop lamps SL can still be lit by operating brake pedal BP. License plate lamp means LP, headlamps HL, and tail lamps TL are steadily illuminated by connection of cylinder 14 to ammeter 51 through contact 31'.

If knob 20 is turned 45° counterclockwise from the "off" position to the first "flare" position, cylinder 14 is connected to ammeter 51 through finger 31', and cylinder 16 is connected to flasher FL through finger 42'. In this position, license plate lamp means LP is thus steadily illuminated, and parking lamps PL and tail lamps TL are simultaneously flashed as an emergency warning signal.

In the second flare position, 90° counterclockwise from the "off" position of switch 10, the same conditions obtain. In addition, however, headlamps HL are steadily illuminated through finger 34' and contact 34e. This provides steady illumination for making repairs, etc.

Referring to Figs. 1 and 3, the addition of conductor 54, connected to finger 41', together with the addition of contacts 41a, 41b, 43a, 44a and 44b, shown in broken lines in Fig. 3, and the omission of conductors 63 and 66, provides an arrangement equivalent to that described. In this case, the parking lamp PL and tail lamps TL are energized only through cylinder 16. In either of the normal "on" positions of switch 10, cylinder 16 is connected to ammeter 51 through finger 41', conductor 54, and conductor 52. In the two flare positions, cylinder 16 is connected to flasher FL. Thus, this alternative arrangement functions in the same manner as the one first described.

The invention thus provides a novel switch and emergency signal lamp arrangement in which the general lighting control and emergency stop signal control are combined in a single switch unit which replaces the usual headlamp control switch. This greatly simplifies the installation of emergency signalling systems on automotive vehicles.

While a specific embodiment of the invention has been described in detail to illustrate the application of the invention principles, it will be understood that the invention may be embodied otherwise without departing from such principles.

What is claimed is:

1. For use in a vehicle having a source of electric energy, headlamps, parking lamps, tail lamps, stop lamps, a brake-operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position and a flare position; said control switch, in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch in the flare position, connecting said parking and tail lamps directly to said flasher, for flashing thereof, and disconnecting said brake operated switch from said source.

2. For use in a vehicle having a source of electric energy, headlamps, parking lamps, tail lamps, stop lamps, a brake-operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position and a flare position; said control switch in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch in the flare position, connecting said parking and tail lamps directly to said flasher, for flashing thereof, said license plate lamp means to said source for steady illumination of said license plate lamp means; and disconnecting said brake-operated switch from said source.

3. For use in a vehicle having a source of electric energy, headlamps, parking lamps, tail lamps, stop lamps, a brake-operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position and a flare position; said control switch, in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch, in the flare position, connecting said parking and tail lamps directly to said flasher, and said license plate lamp means and said head lamps to said source, for flashing of said parking and tail lamps and steady illumination of said license plate lamp means and said head lamps, and disconnecting said brake operated switch from said source.

4. For use in a vehicle having a source of electric energy, headlamps, parking lamps, tail lamps, stop lamps, a brake-operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position, a first flare position, and a second flare position; said control switch, in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch, in the first flare position, connecting said parking and tail lamps directly to said flasher for flashing thereof, and disconnecting said brake operated switch from said source; said control switch, in the second flare position, connecting said parking and tail lamps directly to said flasher and said head lamps to said source for flashing of all of said parking and tail lamps and steady illumination of said headlamps, and disconnecting said brake operated switch from said source.

5. For use in a vehicle having a source of electric energy, headlamps, parking lamps, tail lamps, stop lamps, a brake operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position, a first flare position, and a second flare position; said control switch, in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch, in the first flare position, connecting said parking and tail lamps directly to said flasher and said license plate lamp means to said source for flashing of said parking and tail lamps and steady illumination of said license plate lamp means, and disconnecting said brake operated switch from said source; said control switch, in the second flare position, connecting said parking and tail lamps directly to said flasher and said license plate lamp means and said head lamps to said source for flashing of said parking and tail lamps and steady illumination of license plate lamp means and said head lamps, and disconnecting said brake operated switch from said source.

6. For use in a vehicle having a source of electric energy, headlamps, parking lamps, tail lamps, stop lamps, a brake-operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position, a first flare position, and a second flare position; said control switch, in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch, in the first flare position, connecting said parking and tail lamps directly to said flasher for flashing thereof, and disconnecting said brake operated switch from said source; said control switch, in the second flare position, connecting said parking and tail lamps directly to said flasher and said head lamps to said source for flashing of all of said parking and tail lamps and steady illumination of said headlamps, and disconnecting said brake operated switch from said source; and a flare pilot lamp incorporated in said control switch and connected by the latter to said flasher in both flare positions of said control switch.

7. For use in a vehicle having a source of electric energy, headlamps, parking lamps, tail lamps, stop lamps, a brake operated switch in series with said stop lamps, and license plate lamp means; the combination comprising a flasher connected to said source; and a control switch in circuit connection with said source, said flashers, said brake-operated switch, said lamps, and said lamp means; said control switch having an off position, a parking lamps on position, a head lamps on position, a first flare position, and a second flare position; said control switch, in the off position, connecting said brake-operated switch to said source; said control switch, in the parking lamps on position, connecting said brake-operated switch, said tail lamps, said license plate lamp means, and said parking lamps to said source; said control switch, in the headlamps on position, connecting said brake-operated switch, said tail lamps, said license plate lamp means, and said head lamps to said source; said control switch, in the first flare position, connecting said parking and tail lamps directly to said flasher and said license plate lamp means to said source for flashing of said parking and tail lamps and steady illumination of said license plate lamp means, and disconnecting said brake operated switch from said source; said control switch, in the second flare position, connecting said parking and tail lamps directly to said flasher and said license plate lamp means and said head lamps to said source for flashing of said parking and tail lamps and steady illumination of license plate lamp means and said head lamps, and disconnecting said brake operated switch from said source; and a flare pilot lamp incorporated in said control switch and connected by the latter to said flasher in both flare positions of said control switch.

References Cited in the file of this patent

UNITED STATES PATENTS

| | | |
|---|---|---|
| 1,622,932 | Warburton | Mar. 29, 1927 |
| 2,010,741 | Gullender | Aug. 6, 1935 |
| 2,667,602 | Flemming | Jan. 26, 1954 |
| 2,672,531 | Stevenson | Mar. 16, 1954 |